United States Patent [19]

Leining et al.

[11] Patent Number: 4,901,558
[45] Date of Patent: Feb. 20, 1990

[54] SEAL INTEGRITY TESTER AND METHOD

[75] Inventors: Lyndon R. Leining; Eric S. Vandenberg; Ralph O. Erlandson, all of Austin, Minn.

[73] Assignee: Geo A. Hormel & Co., Austin, Minn.

[21] Appl. No.: 288,676

[22] Filed: Dec. 22, 1988

[51] Int. Cl.⁴ .............................................. G01M 3/36
[52] U.S. Cl. ...................................... 73/49.3; 73/45.4
[58] Field of Search ............... 73/49.3, 52, 45.4, 40.7

[56] References Cited

U.S. PATENT DOCUMENTS

| | | | |
|---|---|---|---|
| 1,962,556 | 6/1934 | Eberhardt. | |
| 2,790,547 | 4/1957 | Sutton. | |
| 3,371,781 | 3/1968 | Armbruster et al. | |
| 3,667,281 | 6/1972 | Pfeifer | 73/37 |
| 3,804,233 | 4/1974 | Gregg, Jr. | 206/19.5 |
| 3,837,215 | 9/1974 | Massage | 73/49.3 X |
| 3,840,171 | 10/1974 | Waters | 229/28 |
| 3,991,622 | 11/1976 | Oowada | 73/49.3 |
| 4,024,956 | 5/1977 | Cassidy | 209/73 |
| 4,053,099 | 10/1977 | Lock | 229/28 |
| 4,173,286 | 11/1979 | Stanko | 206/433 |
| 4,326,408 | 4/1982 | Kanoh | 73/49.3 |
| 4,469,271 | 9/1984 | Kulig | 229/28 |
| 4,645,079 | 2/1987 | Hill | 206/563 |
| 4,663,964 | 5/1987 | Croce | 73/49.3 |
| 4,706,494 | 11/1987 | Creed et al. | 73/49.3 |
| 4,709,578 | 12/1987 | Iwasaki et al. | 73/49.3 |
| 4,715,215 | 12/1987 | Perhach et al. | 73/49.3 |
| 4,722,440 | 2/1988 | Johnston | 206/319 |
| 4,747,299 | 5/1988 | Fox et al. | 73/49.3 |
| 4,771,630 | 9/1988 | Croce et al. | 73/52 X |

FOREIGN PATENT DOCUMENTS

| | | | |
|---|---|---|---|
| 1120200 | 10/1984 | U.S.S.R. | 73/49.3 |
| 1328701 | 8/1987 | U.S.S.R. | 73/40.7 |

Primary Examiner—Michael J. Tokar
Assistant Examiner—Joseph W. Roskos
Attorney, Agent, or Firm—Merchant, Gould, Smith, Edell, Welter, Schmidt

[57] ABSTRACT

The present invention is a method and apparatus for testing filled containers. The apparatus includes both a vacuum sensor and displacement sensors in combination. A computer is utilized to analyze the data from both the vacuum sensor and the displacement sensors, and based on preselected criteria, determines the seal integrity for the container.

23 Claims, 5 Drawing Sheets

SEAL INTEGRITY TESTER AND METHOD

FIELD OF THE INVENTION

This invention relates generally to testing sealed containers and more specifically to a non-destructive vacuum and displacement test for seal integrity of sealed plastic containers.

BACKGROUND OF THE INVENTION

Sealed containers for perishables, such as food, must be tested to insure the integrity of the seal. Typically, when testing the integrity of such containers, sensors are used in connection with placing the container in an evacuated chamber. The walls of the container bulge in this condition since the pressure is greater inside the container than outside the container (i.e., within the chamber). The sensors then gauge a maximum deflection value of the container wall against a predetermined threshold value. If the package deflection is greater than this value, it is considered to have passed the test. However, if the maximum package deflection is less than this value, it is considered to have failed the test, the reasoning being that the container did not bulge due to a leak. The foregoing test is often referred to as a "bulging wall test." This type of test suffers, however, for several reasons, one of which is that it does not typically measure the leak rate of the container (i.e., the deflection may decrease over the length of the test and go undetected). Several efforts have been made to eliminate this problem. For example, U.S. Pat. No. 3,837,215 discloses measuring the container wall travel and velocity of wall travel, while U.S. Pat. No. 4,715,215 discloses holding the reduced pressure within the enclosure constant for a time interval to determine with the sensor whether the distended portion of the container has relaxed.

The foregoing attempts to solve the problems still suffer, however, in the case of a leak with a diameter of several microns, or a leak which is rapidly plugged by the foodstuff (or other contents of the container). This failure is due to the time interval required for the sensors to record the leak, since the time is burdensome in the former and may be infinite in the latter.

Therefore, there exists a need for a test apparatus and method which measures the deflection of a sealed package placed in an evacuated chamber over a period of time in addition to measuring the status of the vacuum within the evacuated chamber.

SUMMARY OF THE INVENTION

The present invention provides a reliable method and apparatus for testing, in a non-destructive manner, the seal integrity of a sealed container for foodstuffs, among others. In an apparatus constructed according to the principles of the present invention, a microprocessor simultaneously examines the measured deflection of the walls or sides of sealed packages placed in a vacuum and evaluates the status of the vacuum within the vacuum chamber. In this manner, various types of leaks, including slow leaks or leaks which quickly plug, may be accurately ascertained. The device also includes several other features which enhance its efficiency, utility and accuracy in determining the integrity of the seal of a plurality of sealed packages, each in their own vacuum chamber.

In a preferred embodiment, the packages to be tested fit in concave trays affixed to a vacuum chamber base. The trays are configured and arranged to allow the containers top and bottom to expand. Displacement type transducers extend up through the base and trays to cooperatively contact the bottom of the packages to be tested. A vacuum chamber lid, which is hingedly attached to the base, is then lowered over the trays, sealing each package within an individual chamber. A second set of displacement transducers extend through the lid to cooperatively contact the top of the sealed packages. Within each chamber resides an atmospheric pressure transducer and means to evacuate the chamber so as to form a vacuum therein. Therefore, within each sealed chamber there is located a tray, a package to be tested, two displacement transducers in contact with the package, an atmospheric pressure transducer, and means to evacuate the chamber.

The above-described transducers are connected to an analog-to-digital converter which provides information to a microprocessor. Once the lid is closed and a vacuum formed in the chambers, a software program utilizes the input from the transducers to determine the integrity of the sealed packages by evaluating the input against preselected pass/fail criteria.

In the event that a package fails, messages from the microprocessor are displayed on an information output device (e.g., a printer or video display monitor). The microprocessor also computes longer term values for each individual chamber and the plurality of chambers (hereinafter referred to for convenience as a "nest").

While the invention will be described with respect to a preferred apparatus and method, and with respect to particular circuit components, devices and components used therein, it will be understood that the invention is not to be construed as limited in any manner by either such described component, device or circuit configuration described herein.

These and various other advantages and features which characterize the invention are pointed out with particularity in the claims annexed hereto and forming a part hereof. However, for a better understanding of the invention, its advantages and objectives obtained by its use, reference should be had to the Drawing which forms a further part hereof and to the accompanying descriptive matter, in which there is illustrated and described a preferred embodiment of the invention.

BRIEF DESCRIPTION OF THE DRAWING

Referring to the Drawing, wherein like numerals represent like parts throughout the several views.

DETAILED DESCRIPTION OF THE PREFERRED EMBODIMENT

As mentioned above, the principles of this invention apply particularly well to the testing of the integrity of a seal of a nest of sealed packages containing perishable goods (i.e., foodstuffs or the like). This invention provides a more accurate test of the integrity of the seal of such packages by utilizing data input from deflection/displacement transducers and atmospheric pressure transducers. An algorithm (described below) used by a central processing unit ("microprocessor") evaluates the data provided by the transducers and provides pass-/fail results of the containers.

Figure 1:
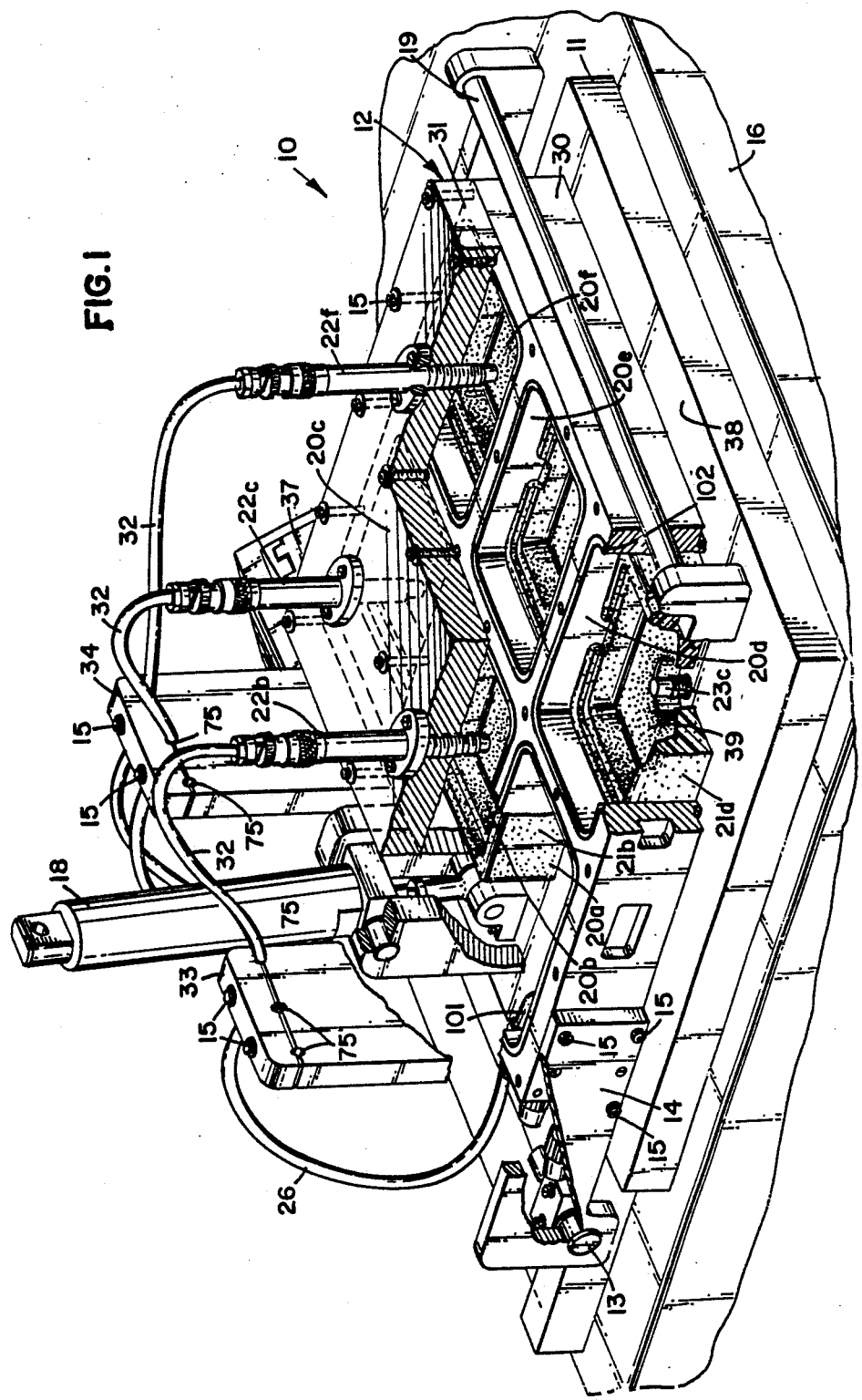
FIG. 1 is a perspective view, with portions broken away, of a test fixture 10 of the present invention constructed according to the principles of the present invention.
Figure 4:
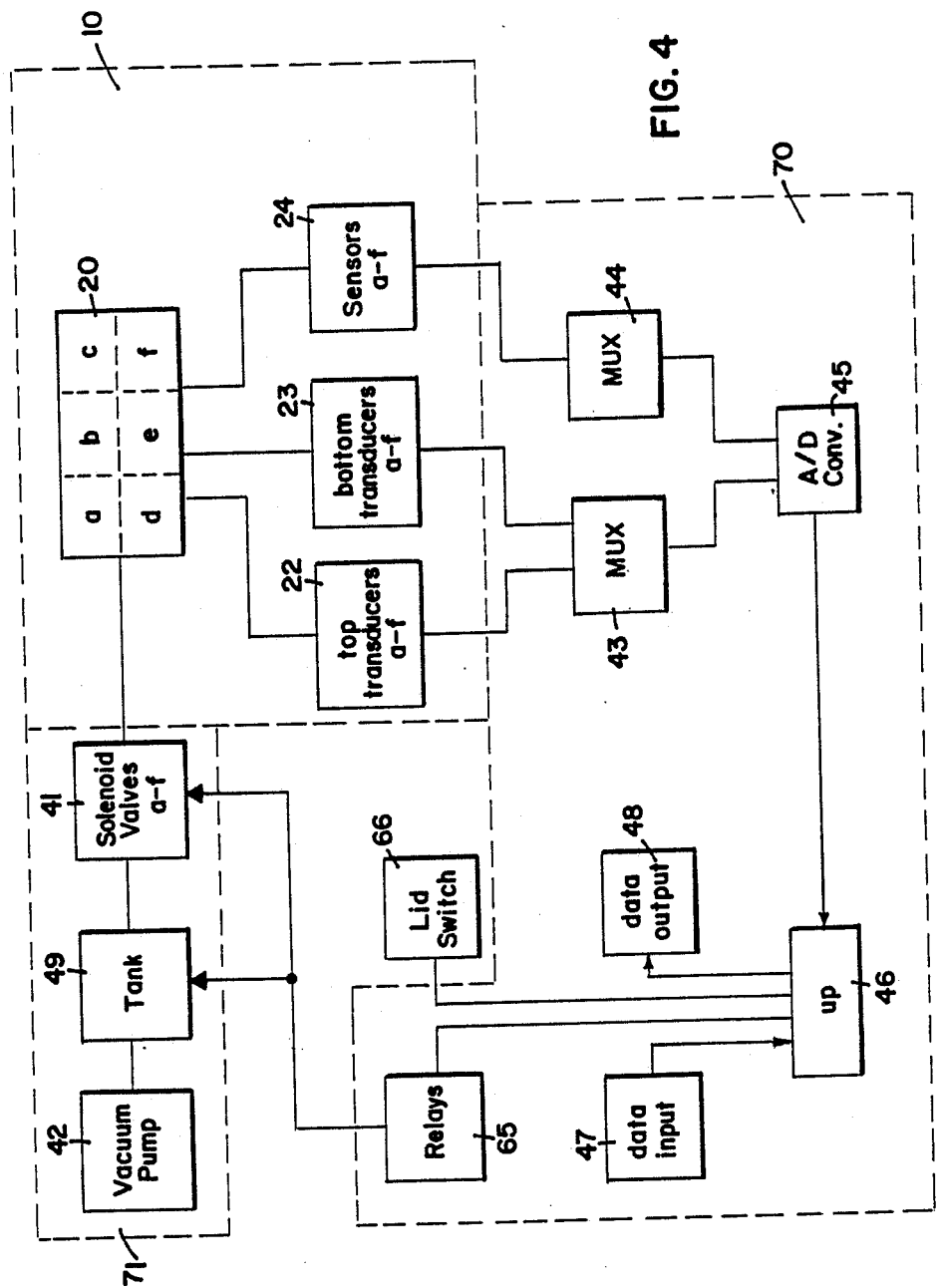
FIG. 4 is a block diagram illustrating functional elements of a preferred embodiment measurement device constructed according to the principles of the present invention.

An example of a preferred embodiment of a test fixture is illustrated in FIG. 1, while a functional block diagram of a preferred embodiment of the present invention is illustrated in FIG. 4. In general, once the machine is switched on and lid 12 is closed, the chambers 20 are evacuated of air to approximately 26.4 inches of mercury. The chamber vacuum solenoid valves 41 are then closed. The readings for the top and bottom package deflection sensors 22, 23 and the vacuum level sensors 24 are captured at a rate of 20 times per second for three seconds. The microprocessor 46 then computes various maximum readings and average readings and determines if individual packages 60 (best seen in FIGS. 6 and 7) fail based on predetermined criteria.

A nominal vacuum range of $0.88 \times 29.9$ inches of mercury or greater is required in the preferred embodiment to establish a differential between the established atmosphere in chamber 20 and any escaping gases from the container 60 under test in order to make such gases readily detectable. This vacuum range may vary for other styles of containers as will become apparent to one skilled in the art and, accordingly, the present invention should not be so limited.

To facilitate understanding of the apparatus, a further description of the functional blocks of FIG. 4 and microprocessor algorithm 51 (best seen in FIG. 5) will now be deferred pending a more complete description of test fixture 10.

Referring first to FIG. 1, there is illustrated a preferred seal integrity test fixture 10 (hereinafter referred to for convenience as the "test fixture") which practices and implements the present invention. The test fixture 10 is comprised of a vacuum chamber base 11 having a smooth upper surface 38), a vacuum chamber lid 12 (a portion of which seals against surface 38), attendant components (described further below) and a support structure 16.

Preferably, vacuum chamber lid 12 is comprised of a lower section 30, having formed therein a plurality of chambers 20a–20f, and a top section 31 attached to lower section 30 via bolts 15 or other suitable fastening devices. Top section 31 has holes formed therein such that top transducers 22a–22f (described further below) may extend through top section 31 into chambers 20 to cooperatively engage or contact the top of the sealed package/container 60 during the test procedure. Similarly, base 11 has holes formed therein such that bottom transducers 23a–23f may extend therethrough into chambers 20 to cooperatively engage or contact the lower surface or bottom (not shown) of the plastic containers 60.

Located within each chamber 20, when vacuum chamber lid 12 is in its down/operative position, is a concave form 21a–21f into which the plastic container 60 to be tested is placed. These forms 21 are suitably affixed or attached to surface 38 to maintain their desired location. In the preferred embodiment, "dowel-like" protrusions (not shown) extend up from base 11 into mating holes (not shown) formed into the base of the forms 21. The forms 21 preferably have an open top and four sides. The interior bottom 39 of forms 21 slopes downward from the side walls to the opening in the center for bottom transducer 23 to allow container 60 to bulge downward. Form 21 also preferably provides for free gaseous flow beneath the form 21, in part dependent upon the placement of the chamber evacuation means 71 and vacuum sensors 24.

Forms 21 are arranged and configured to seat container 60 snugly around the container's 60' side edges while allowing expansion of the top 61 and bottom 64 of container 60. The form 21 is open at its top while the interior bottom 30 slopes downward, as noted above, to provide for the distension of the top 61 and bottom 64 of container 60. The form 21 itself is approximately rectangular in shape and fits within the approximately rectangular box shape of chamber 61.

Figure 6:
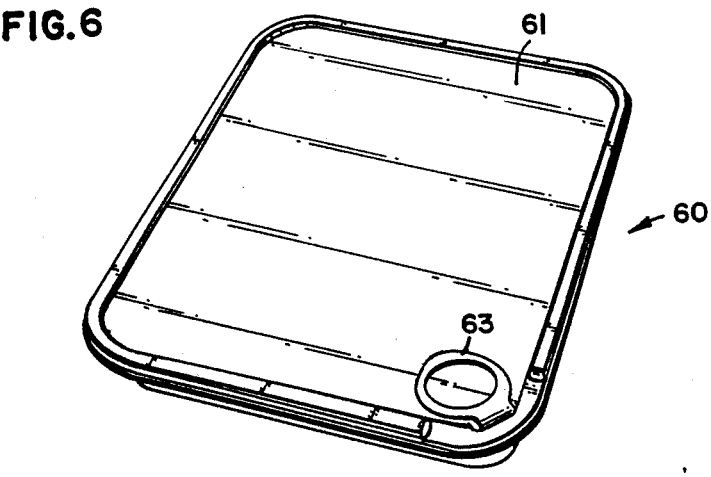
FIG. 6 is a perspective view of a sealed package 60.
Figure 7:
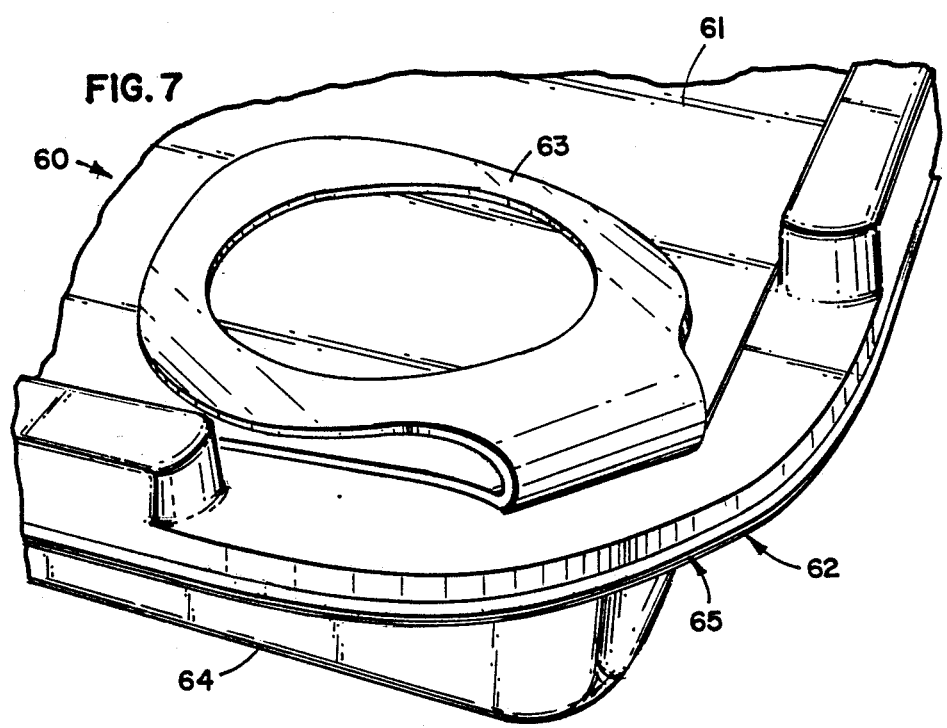
FIG. 7 is an enlarged view of a portion of the sealed package of FIG. 6.

The container 60 evaluated by the preferred embodiment test fixture 10 is a container for Top Shelf style food products, sold by the assignee of the present invention. This container 60 also has an approximately rectangular box shape. Also illustrated in FIGS. 6 and 7 are pull tab 63 to open container 60 and container lips 62 and 65.

The forms 21 are preferably manufactured of a material which does not "gas off" when in a vacuum so that vacuum readings are not affected. In the preferred embodiment, the forms are made of Delrin ® type plastic composite material.

As noted above, located within/extending-through base 11 are vacuum transducers/sensors 24 (described further below) and openings suitable for evacuating and/or venting the chambers 20.

Handle 19 is attached to lid 12 providing or the manual raising and lowering of lid 12. Lid 12 is hingedly attached to table surface 11 by means of hinge 14 and hinge pin 13, each of which are suitably attached to lid 12 and base 11 via bolts 15. It will be apparent to those skilled in the art that although numerous bolts 15 are illustrated in the accompanying Figures, no effort has been made to correlate each and every bolt 15 to those illustrated. Those skilled in the art will recognize that other suitable fastening devices, welds, rivets, etc., might similarly be used in such a test fixture 10 as described herein.

Also attached to base 11 are connection extension members 33, 34. Members 33, 34 are used to ensure that transducer connections 25, 26 are maintained at a secure distance to avoid pinching the connections 25, 26 during the opening and closing of lid 12 during fixture 10's operation. Preferably means for removing the top portion of members 33 and 34 at the connection guide holes 75 are provided. This allows placing connections 25, 26 through connection guide holes 75 formed therethrough without having to disconnect the connection wires 25, 26. Transducer connections 32 are grouped into connection. 26 and extend through base 11 (via strain relief connector 101) to multiplexor 43.

Also provided for in fixture 10 is cylinder 18 pivotally attached to lid 12. The extension rod of cylinder 18 is attached to base 11 to aid and damp the raising and lowering of vacuum chamber lid 12. At the end of the test procedure when the vacuum is "released" (i.e., the chambers 20 are vented to normal atmospheric pressure), a force is exerted upward on lid 12. Air cylinder 18 dampens this upward motion to provide safe operation of test fixture 10. Air pressure adjustment means (not shown) allows adjustment of the rate of opening of lid 12. Cylinder 18 may also be hydraulic or other suitable style cylinder.

Also illustrated in FIG. 1 is an RS-232 serial interface port 37 (with its cover closed) for data entry by a device (such as a serial information input mouse, not shown) or for communicating to a host computer (not shown).

Support structure 16 of fixture 10 may be used to house other components of the apparatus such as chamber evacuation means 71 comprised of vacuum pump 42, solenoid valves 41 and expansion tank 49 (as best seen in FIG. 4). Such placement of the solenoid valves 41 is desirable in order to locate the valves 41 as close as possible to the test chambers 20 so as to reduce the amount of air/gaseous medium required to be evacuated from the test chambers 20 during the test operation procedure.

Preferably, bottom section 30 and base 11 are made of 2024 aluminum material. However, other materials, such as a plastic might be used, the design considerations being material strength, weight and resistance to "gassing off," among others, as those skilled in the art will recognize. Top section 31 is preferably made of an acrylic sheet. Use of this type of transparent plastic allows for visual inspection of chambers 20 during operation of the test. Other abrasion resistant plastic materials or glass could similarly be used.

Figure 2:
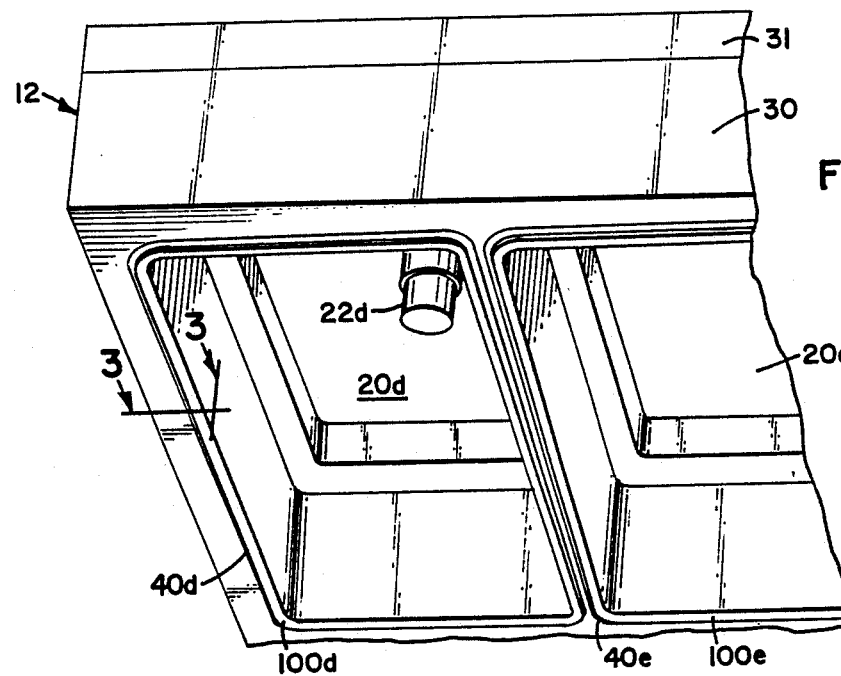
FIG. 2 is a perspective view of a portion of vacuum chamber lid 12 of the test fixture 10 of FIG. 1.
Figure 3:
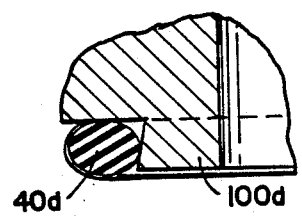
FIG. 3 is a cross-sectional view taken through line 3—3 of FIG. 2.

Next, referring to FIGS. 2 and 3, there is illustrated chamber 20d of milled section 30, as viewed from the side which contacts table surface 11. It will be apparent to those skilled in the art that first, although chamber 20d is illustrated, other chambers 20 of fixture 10 are similar in design, and second, that the shape of chamber 20d is illustrated by way of example of the preferred embodiment of fixture 10. Other sizes and shapes of chamber 20 might be used. In the preferred embodiment, chambers 20 were designed to provide minimal clearances about form 21, thereby reducing the amount of gaseous medium required to be evacuated from the chamber 20 during the test phase. It will be apparent that the size and shape of the container 60 to be tested and form 21 must be taken into account (as well as the accuracy of the pressure sensor 24 described below) when designing chamber 20 in order to maximize the efficiency of the present invention. As noted above, chamber 20 has an approximately rectangular plan form and has an approximately rectangular box-like shape. The bottom of chamber 20 is open when lid 12 is open/raised. The bottom is comprised of flat surface 38 when lid 12 is closed (i.e., when lid 12 is in its operative position).

Sealing gaskets 40 and 102 are used to seal the various portions of chambers 20. Sealing gasket 40d lies adjacent to and below a shoulder 100 of bottom section 30. This shoulder 41 is located about the entire periphery/perimeter of the bottom edge of each chamber 20. This gasket 40d provides a seal between shoulder 100 and base 11, more specifically flat surface 38, when vacuum chamber lid 12 is lowered. The choice of sealing gasket 40d as the sealing means is dependent on several factors, including in part on the evacuated atmospheric pressure of the chambers 20, the "downward" force applied to vacuum chamber lid 12 when closed to seal against flat surface 38, and the arrangement of shoulder 100, as those skilled in the art will recognize. In the preferred embodiment "O" rings manufactured by Apple Rubber Products, Inc. of Lancaster, N.Y., having the designation #422 Buna-N are used. However, any sealing type gasket which provides for a constant positive seal may be used. A similar O-ring 102 is used to seal bottom section 30 to top section 31 about each chamber 20 (best seen in FIG. 1).

Next, turning to FIG. 4, there is illustrated a block diagram of the functional elements of a preferred embodiment of the present invention. The test fixture 10 with solenoid valves 41 is located between test chambers 20 and expansion tank 49. Expansion tank 49 is connected to pump 42. The transducers 22, 23 and sensors 24 are attached to test chambers 20 with their output fed to multiplexor cards 43 and 44. The multiplexor cards 43, 44 multiplex the signals from the transducers 22, 23 and sensors 24 to A to D convertor 45. This signal is then transmitted to the microprocessor 46. Attached to the microprocessor 46 is data input device 47 which may comprise a serial input device such as a mouse, a keyboard, or magnetic storage media among others. Data output device 48 may be a printer, video display unit, magnetic storage medium or other output device. Data processing means 70 also includes relays 65.

It will be appreciated by those skilled in the art that although in the preferred embodiment program logic is resident in EPROM (not shown), it might be down loadable from ROM, serially input, loaded from magnetic medium, or resident in some other memory device. Further, while not specifically detailed in FIG. 4, it will be understood that the various functional elements are to be properly connected to appropriate bias and reference supplies so as to operate in their intended manner. Similarly, it will be understood that appropriate memory, buffer and other attendant peripheral devices are to be properly connected to microprocessor 46, A/D converter 45 relays 65, lid switch 66 and multiplexor cards 43, 44 so as to operate in their intended manner. Also those skilled in the art will recognize that interconnections between functional blocks 42, 49, 41 and 20 represent gaseous flow while the remaining interconnections represent signal paths.

In the preferred embodiment, vacuum pump 42 is a single stage rotary vane vacuum style pump designated by the model number RA0063, manufactured by Bush Inc., of Downers Grove, Ill. The pump 42 generates three horsepower at 1,710 r.p.m. while operating at 460 volts (3-phase) and moving 41 cfm. However, those skilled in the art will recognize that any pump capable of evacuating test chambers 20 to appropriate test pressures may be utilized. In the preferred embodiment, the testing is performed at 26.4 inches of mercury. Other means to evacuate chambers 20 to this percentage of atmosphere may be suitable such as a vortex blower (e.g. ring compressor) and similar vacuum forming devices. The vacuum pump 42 is connected to the expansion tank 49 by means of conduit to provide for a gas flow path. Expansion tank 49 is kept at 29.7 inches of mercury and is maintained at that level by vacuum pump 42, which runs continuously when the apparatus is turned on, in order to aid the evacuation of test chambers 20 through solenoid valves 41.

The solenoid valves 41 are connected to tank 49 via plastic type TYGON ® tubing having a ¾ inch interior diameter. This type of tubing provides a clear kinkresistant path. Other style tubing or pipe which is capable of withstanding the atmospheric pressures utilized in the apparatus and which resists kinking may be used. The connections between solenoid valves 41a–41f and chamber 20a–20f each comprise a separate tube.

The solenoid valves 41, in the preferred embodiment, are ½ inch NPT 2-way solenoid valves manufactured by Asco Corporation, designated by the number 8030 A17VM. The solenoid valves are controlled by microprocessor 46 via 24 volt opto-relays 65, and are activated (i.e., closed) when the corresponding test chamber 20 reaches 26.4 inches of mercury. Other ranges of atmosphere may be used as those skilled in the art will recognize. The useful range depends upon the transducers and sensors used, as well as the point at which the test becomes destructive to container 60.

The test range must provide statistically significant pass/fail rates for the containers 60 to be tested. As those skilled in the art will recognize, if one assumes that containers 60 fall into a normal distribution for seal integrity, then one can establish a percentage of quality inspection with a certain degree of confidence/accuracy. To a large extent, the criteria to pass/fail each container, to provide statistically significant pass/fail rates, must be adjusted based on physical characteristics of the container and condensation present on the container or within the chamber, among other factors.

Transducers 22, 23 residing within chambers 20 are Novotechnick inductive position transducers. The transducers utilize contact sensing. Such contact type transducers have advantages over non-contact transducers (i.e., optical transducers) in that if the container 60 utilizes a wavy top plastic or condensation forms on the container distorted, readings may occur. Such other styles may be used, however. The sensors 22, 23 utilized in the preferred embodiment have a resolution of plus or minus 0.003 inches. This type of transducer 22, 23 is commonly called a linear transducer or LVDT.

To provide a reference point for transducers 22, 23, an initial reading is established prior to the formation of the vacuum in chamber 20. Microprocessor 46 also verifies that this reading is above a preset level.

Vacuum sensors 24 are preferably model 204 vacuum transducers manufactured by Setra Systems, Inc., of Acton, Mass., designated as model number 204. These sensors have an accuracy of 0.11% of full scale. Therefore, these sensors 24, preferably mounted in base 11, are sensitive to leaks on the order of 3 microns in the container 60 to be tested. Sensors 24 provide fast response, accuracy, ruggedness and minimal signal conditioning. Sensors 24 also provide a linear output.

The position transducers 22, 23 and sensors 24 are multiplexed through two cards. The first is an EXP-16 analog input expansion sub-multiplexor manufactured by MetraByte and the second is an EXP-16 with PG-408 option for the Novotechnick LVDT's. The output from the two multiplexors 43, 44 is transmitted to an analog-to-digital converter card 45 which provides digital information to microprocessor 46. The successive-approximation type analog-to-digital converter card is a DAS-8 and is manufactured by MetraByte Corp. of Taunton, Mass., designated by the number 45. The microprocessor 46 in the preferred embodiment is an Ampro Little Board PC model 4b-3, manufactured by Ampro Computer, Inc., of Sunnyvale, Calif., although those skilled in the art will recognize that other microprocessor devices or commonly-available personal computers may be used.

There is also a lid microswitch 66 which senses when vacuum chamber lid 12 is in contact with base 11. This microswitch transmits a signal to microprocessor 46. Microswitch 66 is used to prevent attempting to evacuate chamber 20 prior to the chamber 20 being appropriately sealed. To vent chambers 20, microprocessor 46 activates two other 24 volt opto-relays 65 connected to additional solenoid valves (not shown) connected to a common manifold (not shown) located between tank 49 and valves 41. One valve vents the manifold to ambient atmosphere. The second valve isolates the tank 49 from the manifold. When the manifold is vented and valves 41 are opened, the chambers 20 are vented as well and the vacuum is "released." These two additional valves are similar to valves 41, except that they are preferably 1½" in diameter.

Figure 5:
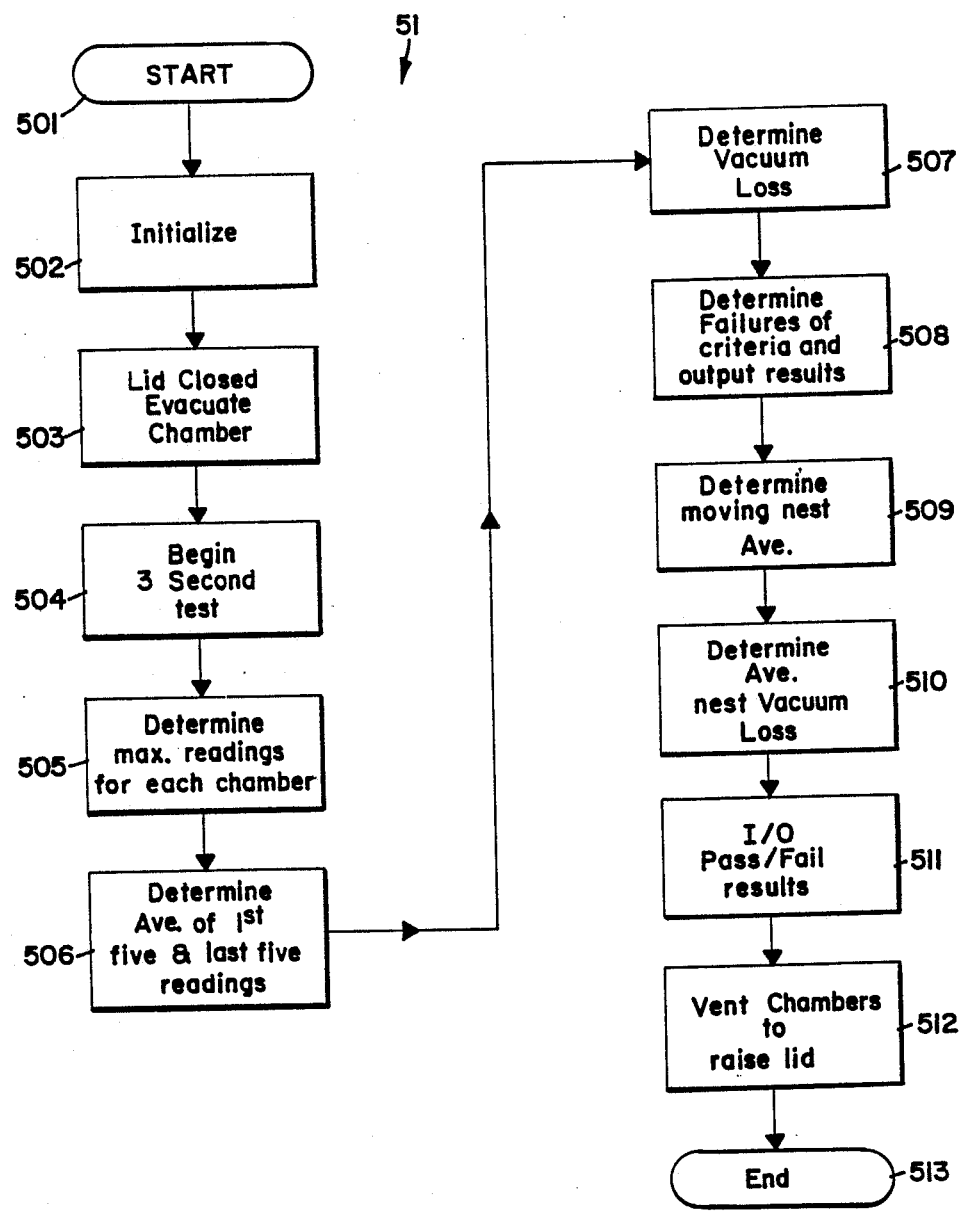
FIG. 5 is a logic block diagram illustrating computer program operation of the device of FIG. 4.

In operation, as best seen in FIG. 5, containers 60 are placed within the test chambers 20. Lid 12 is then closed. Microswitch 66 is activated, thereby enabling the program 51. The logic flow diagram of an embodiment of program logic is shown generally at 51. The logic flow diagram 51 illustrates the steps taken to analyze the information provided by transducers 22, 23 and sensors 24.

Although microprocessor 46 will be characterized as "proceeding" from logical block to logical block, while describing the operation of the program logic, those skilled in the art will appreciate that programming steps are being acted on by microprocessor 49.

Therefore, in operation, microprocessor 49 starts at block 501. Microprocessor 49 then proceeds to block 502 to initialize registers and memory, and load the programming logic 51 from EPROM (not shown). Such operation is well known to those skilled in the art and so will not be described further herein.

Next at block 503 the vacuum chamber lid 12 is closed, and the vacuum level in each of the chambers 20 is drawn down to 26.4 inches of mercury. To do so, valves 41 are opened putting chambers 20 in fluid communication with tank 41. Microprocessor 46 then waits for the test vacuum to be reached. Valves 41 are closed upon the chambers 20 being evacuated to the appropriate vacuum.

At block 504 the test is started. The readings for the top 22 and bottom 23 package deflection sensors and the vacuum level sensors 24 are captured at the rate of 20 times per second for three seconds, via multiplexor cards 43, 44 and A-D converter 45. These values are stored in RAM (not shown).

Next at block 505, maximum readings for the top 22, bottom 23, and the combination of top 22 and bottom 23 sensors for each chamber are determined and stored in an array in RAM (not shown).

The times of such readings are also stored. Next, at block 506, an average of the combination top 22 and bottom 23 transducer readings for the first five readings and the last five readings are computed.

The microprocessor then continues to block 507, where an average of the vacuum level loss or degradation for the first five readings and the last five readings are computed. A moving average of the vacuum loss for each chamber 20 is determined by computing the average loss for the six chambers 20 combined, while ignoring vacuum level readings for those tests in which 60 a package fails for any reason.

Microprocessor 46 then determines, at block 508, whether any individual chamber 20 of that test nest has failed the following six test criteria:

1. Fail package if both top 22 and bottom 23 sensor readings reach maximum values in the first two seconds of the test (from block 505). This criteria is intended to fail packages which contract after a first portion of the test interval. A typical failing container 60 will "balloon" (i.e., walls distend) and then deflate. This criteria is intended to fail those packages 60 in which both top 22 and bottom 23 sensors show a loss. In a small number of containers 60, it has been found that the bottom 64 expands faster than top 61 or that the top 61 contracts slightly. Therefore, this first criteria requires both top and bottom maximums.

2. Fail package if the value from the sum of the first five readings is equal to or less than the value from the sum of the last five readings (from block 506). This criteria fails those containers 60 which have a leak and therefore initially expand in a first portion of the test interval and then deflate as the greater pressure within the container 60 leaks into the chamber 20. Therefore, this second criteria evaluates the container's 60 seal, maintaining its integrity over the test interval.

3. Fail package if vacuum loss is greater than 0.30% for normalized value of first five readings minus the last five readings (from block 507). This third criteria looks at vacuum degradation within chamber 20. If the vacuum is degraded, air is escaping from the container 60 into the chamber 20. However, since a perfect chamber 20 seal is not expected, microprocessor 46 actually compares one chamber 20 against the other chambers 20 of that nest. The result is a statistical comparison of the degradation of the chamber 20 against the nest from a first portion of the test interval to a last portion of the test interval.

4. Fail package if sum of top and bottom sensors reaches maximum value in first two seconds of test and the value of #2 above is less than +0.005 (difference between first five readings of top and bottom sensors and last five readings). This fourth criteria is established to fail those packages 60 having a failing seal integrity which criteria numbers 1 and 2 above do not otherwise discover. The sum of the top 22 and bottom 23 displacement sensors are evaluated over a first portion of the test interval. If the container 60 fails this first part of the fourth criteria, if the displacement is less than a threshold value, then container 60 is failed. This type of failure may occur due to a dent in container 60.

5. Fail package if the combination of top 22 and bottom 23 sensor values reaches a maximum in the first two seconds of the test interval and the normalized vacuum loss, is greater than a cutoff level 0.10% (greater than 0.30% of criteria number 3 above). This criteria is less restrictive than earlier and is a combination test. The criteria determines the top 22 and bottom 23 displacement sensor maximums in a first portion of the test interval and determines whether statistically significant vacuum degradation has occurred.

6. Fail package if the maximum sum of top 22 and bottom 23 sensors is less than a maximum sum cutoff value of 0.70. This criteria fails those containers 60 which have large leaks and therefore do not expand (or expand only a de minimis amount). This criteria, therefore, establishes a minimum standard for deflation by failing a container 60 which does not expand past the threshold value.

A container 60 which fails one criteria may fail several. The foregoing criteria may also be adjusted for greater quality control and/or confidence as noted above.

If a package fails, a one-line message is printed which indicates the test, the nest chamber 20, which criteria resulted in the failure, time of maximum deflection, the difference of the first and last five values, the normalized vacuum and the maximum sum. It will be apparent that these criteria may be modified to reflect the container 60 being tested and the desired control.

Next, at block 509, an exponentially-smooth moving average for vacuum loss in each chamber 20 is maintained and computed. For each chamber 20 the moving average equals 0.90 times the moving average from the last test plus 0.10 times the vacuum loss of this test. The moving average is not updated for a nest if the chamber 20 failed.

Proceeding to block 510, for each test, an average vacuum loss is calculated for the nest while ignoring any chamber 20 of the nest which fails for any criteria excluding vacuum loss. For each chamber 20 the vacuum loss is normalized as follows:

Normalized vacuum loss=(actual vacuum loss)−(nest average)−((moving average for the chamber 20) (moving average for the nest)).

Following the three-second test at block 511, pass/fail results are displayed on the video output unit and the sensor readings are stored or discarded as provided above. The foregoing averages, normalization, and results may be calculated and maintained for individual chambers 20 as well as for each test nest.

The lid is raised automatically at block 512 as the chambers 20 are vented to atmospheric pressure.

At block 513 the test sequence ends. At this time the operator may remove the packages 60 from the fixture 10 and record lot number, type of failure, etc. via the input device in response to preprogrammed prompts for those packages that failed. Via software prompts, the operator can then reset the program logic 51 to return to block 503 to begin a new test sequence. Alternatively, microprocessor 44 may preferably return to block 503 automatically.

It is to be understood that even though numerous characteristics and advantages of the present invention have been set forth in the foregoing description, together with details of the structure and function of the invention, the disclosure is illustrative only and changes may be made in detail, especially in matters of the vacuum flow through the device, and the supporting hardware and software routines and data structures, and to the full extent indicated by the broad general meaning of the terms in which the appended claims are expressed.

We claim:

1. A vacuum test apparatus of the type wherein a filled sealed plastic container having first and second walls is tested for seal integrity comprising:
   (a) a test chamber;
   (b) means for holding the container within said chamber;
   (c) means for creating a specified vacuum within said chamber;
   (d) means for measuring the displacement of the first and second container walls when the vacuum is created and transmitting signals indicative of the displacements;
   (e) vacuum measuring means for evaluating the vacuum loss within said chamber after the vacuum is created and transmitting a signal indicative of the vacuum; and (f) data processing means, receptive to said displacement and vacuum signals, for determining the seal integrity of the plastic container based on the received signals compared with preselected criteria.

2. The apparatus of claim 1, wherein said displacement measuring means comprise an inductive position transducer device.

3. The apparatus of claim 1, wherein said vacuum measuring means comprise a vacuum sensor.

4. The apparatus of claim 1, wherein said data processing means comprises:
(a) a multiplexor operatively connected to said two transducers and said sensor;
(b) an analog-to-digital convertor operatively connected to said multiplexor for converting said signals from analog to digital; and
(c) a microprocessor for sampling said converted signals.

5. The apparatus of claim 4, wherein said vacuum creating means comprises a vacuum type pump.

6. The apparatus of claim 1, wherein said holding means is configured and adapted to support the container and allow for expansion of the first and second walls.

7. A vacuum test apparatus of the type wherein a filled sealed plastic container having a first and second walls is tested for seal integrity comprising:
(a) a test chamber, wherein said test chamber is comprised of a material not prone to gassing off in a vacuum environment;
(b) means for holding the container within said chamber, said container holding means being comprised of a material not prone to gassing off in a vacuum environment;
(c) means for creating a specified vacuum within said chamber;
(d) means for measuring the displacement of one of the container walls when the vacuum is created and transmitting a signal indicative of the displacement;
(e) vacuum measuring means for evaluating the vacuum loss within said chamber after the vacuum is created and transmitting a signal indicative of the vacuum; and
(f) data processing means, receptive to said displacement and vacuum signals, for determining the seal integrity of the plastic container based on the received signals compared with preselected criteria.

8. The apparatus of claim 7, wherein said displacement measuring means comprise two transducer devices, said devices extending through openings formed in said chamber and operatively contact the container.

9. A vacuum test method, of the type wherein a filled sealed plastic container having a first and a second side is tested in a vacuum test chamber for seal integrity, said method comprising the steps of:
(a) creating a specific vacuum within the chamber;
(b) determining the displacement of the first and second sides of the container when the vacuum is created;
(c) determining the degradation of the vacuum; and
(d) evaluating the displacements and degradation against preselected criteria to determine the integrity of the container seal.

10. The method of claim 9, wherein steps (b) through (d) are repeated a plurality of times over a specified test interval having several portions.

11. The method of claim 10, wherein said evaluating step is comprised of the container failing if the displacement of the first and second sides reach maximum values in a first portion of the test interval.

12. The method of claim 10, wherein said evaluating step comprises the container failing if the displacement from a first group of readings in a first portion of said test interval is equal to or less than the displacement from a last group of readings in a last portion of said test interval.

13. The method of claim 10, wherein said evaluating step comprises the container failing if the vacuum degradation is greater than a statistically significant percentage of a normalized value of a first group of readings during a first portion of said test interval minus a last group of readings during a last portion of said test interval.

14. The method of claim 10, wherein said evaluating step comprises the container failing if the sum of the displacement of the first and second side reaches a maximum value in a first portion of said test interval and if the displacement from a first group of readings in a first portion of said test interval is less than a threshold value of the displacement from a second group of readings in a last portion of said test interval.

15. The method of claim 10, wherein said evaluating step comprises the container failing if a combination of the first and second sensor values reaches a maximum in a portion of said test interval and a normalized vacuum loss is greater than a cut-off level of a statistically significant percent.

16. The method of claim 10, wherein the evaluating step comprises the container failing if the maximum sum of the first and second sensors is less than a maximum sum threshold value.

17. The method of claim 10, wherein said evaluating step comprises:
(a) transmitting information to data processing means;
(b) storing information until the end of said test time;
(c) comparing said stored information against preselected criteria; and
(d) providing an indication through an output device of the results of said comparison.

18. The method of claim 17 wherein the stored information is compared against more than one preselected criteria.

19. A vacuum test method, of the type wherein a filled sealed plastic container, having a top and a bottom, is tested in a vacuum test chamber for seal integrity by use of position sensors in operative contact with the container top and bottom and a vacuum sensor in said chamber, said method comprising the steps of:
(a) evacuating the chamber so as to form a vacuum;
(b) capturing and storing information concerning the container top and bottom displacement from the position sensors and the vacuum from the vacuum sensors, for a specified time interval;
(c) determining maximum and average readings for the position sensors and the combination of position sensors;
(d) determining an average reading for vacuum level loss; and
(e) evaluating said determined readings against preset criteria whereby the integrity of the sealed container may be determined.

20. The method of claim 19, further comprising providing a signal to an output device indicative of said evaluation.

21. The method of claim 19, further comprising simultaneously performing steps (a) through (e) for a plurality of vacuum chambers.

22. The method of claim 21, further comprising determining averages of the plurality of chambers.

23. The method of claim 22, wherein said determined readings are evaluated against more than one of said preset criteria.

* * * * *

UNITED STATES PATENT AND TRADEMARK OFFICE
CERTIFICATE OF CORRECTION

PATENT NO. : 4,901,558

DATED : February 20, 1990

INVENTOR(S) : Leining et al

It is certified that error appears in the above-identified patent and that said Letters Patent is hereby corrected as shown below:

In column 4, line 40, please delete the word "or" and substitute therefor --for--.

In column 4, line 46, please delete the word "Figures" and substitute therefor --Figs.--.

In column 4, line 63, after the word "connection" please delete ".".

In column 10, line 3, please delete "." and substitute therefor --,--.

Signed and Sealed this

Nineteenth Day of February, 1991

Attest:

HARRY F. MANBECK, JR.

*Attesting Officer*   *Commissioner of Patents and Trademarks*